United States Patent

[11] 3,602,793

| [72] | Inventor | Alfred Grozinger<br>Stuttgart, Germany |
|---|---|---|
| [21] | Appl. No. | 21,679 |
| [22] | Filed | Mar. 23, 1970 |
| [45] | Patented | Aug. 31, 1971 |
| [73] | Assignee | Robert Bosch GmbH<br>Stuttgart, Germany |

[54] RECTIFIER HOUSING UNIT HAVING ADJACENT PARALLEL OPPOSITELY-BIASED COOLING PLATES
20 Claims, 11 Drawing Figs.

[52] U.S. Cl. .................................................. 320/8 C,
310/68, 317/234
[51] Int. Cl. .................................................. H02m 7/00
[50] Field of Search .......................................... 321/8, 8 C;
317/234; 310/68, 68.4

[56] References Cited
UNITED STATES PATENTS

| 3,041,484 | 6/1962 | Freer et al. ................ | 310/68 R |
| 3,226,581 | 12/1965 | Brewster et al. ............ | 310/68 R |
| 3,295,046 | 12/1966 | Margaira ..................... | 321/8 C |
| 3,329,841 | 7/1967 | Binder et al. ................ | 321/8 X |
| 3,422,339 | 1/1969 | Baker .......................... | 321/8 X |

*Primary Examiner*—J. D. Miller
*Assistant Examiner*—John M. Gunther
*Attorney*—Michael S. Striker

ABSTRACT: A rectifier unit has inner and outer conductive annular cooling plates with matching outer and inner annular edges and held by an insulator in parallel planes in a centered position in which the inner and outer annular edges register. Positive and negative rectifier diodes are mounted on the inner and outer plates in conductive connection with the same, respectively. Other connectors and circuit elements are supported by the insulator.

3,602,793

INVENTOR
Alfred GRÖZINGER
BY

Michael S. Striker
his ATTORNEY

INVENTOR
Alfred GRÖZINGER
BY his ATTORNEY

INVENTOR
Alfred GRÖZINGER
BY his ATTORNEY

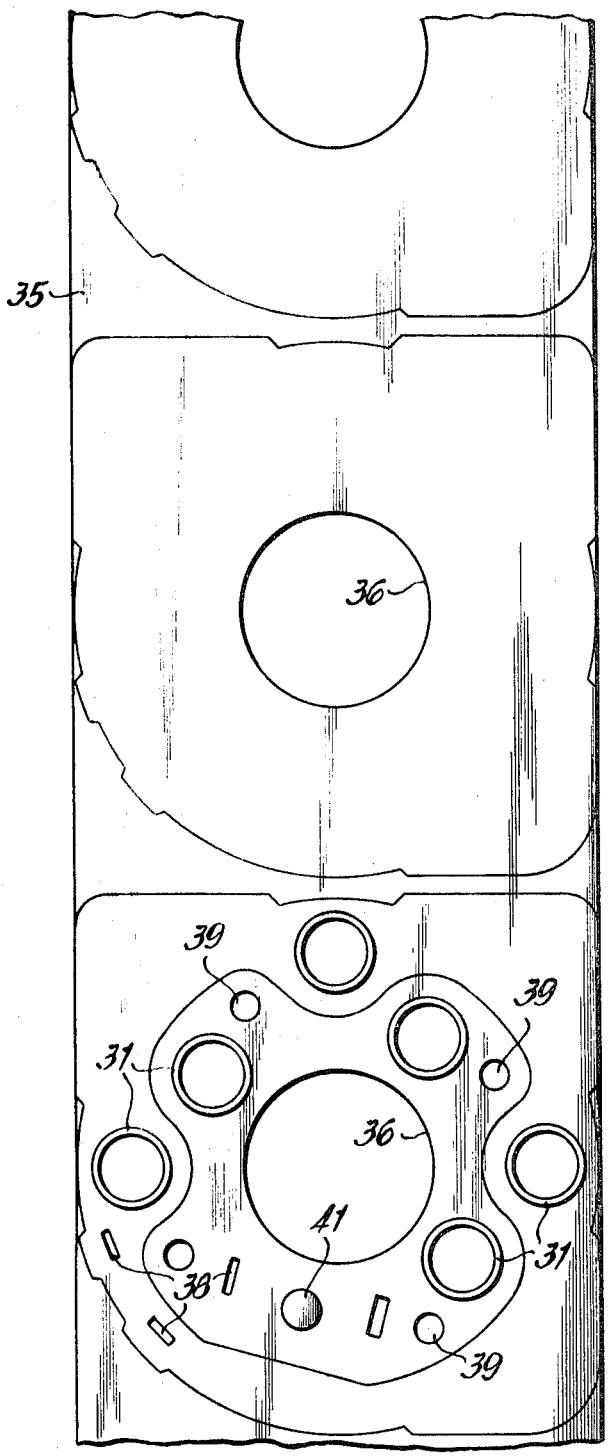

RECTIFIER HOUSING UNIT HAVING ADJACENT PARALLEL OPPOSITELY-BIASED COOLING PLATES

BACKGROUND OF THE INVENTION

The present invention relates to a rectifier unit for insertion into a alternating current generator particularly for a three-phase generator. The unit is provided with plus diodes for generating positive polarity, and with minus diodes for generating negative polarity.

In a known rectifier unit, each set of diodes is mounted on a metal sheet, and a separate insulator is provided with electrical connectors to which the terminals of the diodes are connected.

The known rectifier unit is difficult to manufacture and assemble, which is particularly undesirable for mass production.

SUMMARY OF THE INVENTION

It is one object of the invention to overcome the disadvantages of known rectifier units, and to provide a rectifier unit which is compact, and resistant against oscillations.

Another object of the invention is to provide a rectifier unit which can be easily mounted in the housing of a generator.

Another object of the invention is to provide a rectifier unit which can be easily assembled by unskilled workers.

With these objects in view, a rectifier unit according to the present invention has plus diodes and minus diodes respectively supported on cooling plates which are arranged in parallel planes without overlapping, while an insulator connects the two plates mechanically, insulating the same electrically.

One embodiment of the invention comprises first and second sets of diodes having opposite polarity, a first cooling plate supporting the first set of diodes and having an outer edge, a second cooling plate supporting the second set of diodes and having an inner edge, the first and second cooling plates being located in parallel planes, and an insulator engaging the inner and outer edges for electrically insulating the cooling plates from each other while mechanically connecting the first and second cooling plates to each other in a centered position in which the inner and outer edges do not overlap.

In the preferred embodiment of the invention, the first and second cooling plates are annular and substantially concentric and have, respectively, inner and outer edges having matching outlines and dimensions and being parallel in the centered position. The cooling plates can be easily stamped out of a band of sheet metal, and since the inner edge of the outer cooling plate and the outer edge of the inner cooling plate do not overlap, the inner cooling plate can be punched out of the outer cooling plate without any losses of sheet material. Since the insulator is constructed as a mechanical connection and electric insulation, the assembly is easy, and permits the use of the insulator for additional functions.

Although the inner and outer edges of the outer and inner annular cooling plates match each other, they are spaced from each other since the two cooling plates are disposed in parallel planes. The insulator has an annular portion completely filling the gap between the inner and outer edges.

In the preferred embodiment of the invention, the outer annular cooling plate has a set of inner radial projections, and the inner annular cooling plate has a set of outer radial projections respectively alternating with the inner projections in circumferential direction. The plus and minus diodes are respectively mounted on the two sets of projections. The positive diodes are mounted on the other annular plate in conductive connection with the same. At least one of the annular plates has a connector for connection with a cable, and the assembly of the diodes is extremely simple, since the diodes pushed into tubular seats of the respective plates. In this manner, the electrical connection between the diodes and the plates is obtained by assembling the diodes. The insulator has pot-shaped projections located between the positive and negative diodes of a pair of diodes, and the respective diodes have connectors located in the pot-shaped projections which are filled by soldering material. Exciting diodes are also provided whose terminals can also be inserted into the pot-shaped projections for connection with the positive and negative diodes of the respective pair.

In the preferred embodiment, the inner plate has a central opening, and the insulator has a tubular portion located in the center opening of the inner annular plate. This tubular portion can be used as brush holder for the brushes which engage the slide rings of an alternating current generator. The insulator may also be used as holder and support for additional exciting diodes and have a conductor to which terminals of the exciting diodes are connected.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIGS. 8a, 8b and 8c illustrate portions of a sheet metal band from which the cooling plates are punched out in accordance with the method of the invention.

DESCRIPTION OF THE PREFERRED EMBODIMENTS

Figure 9:
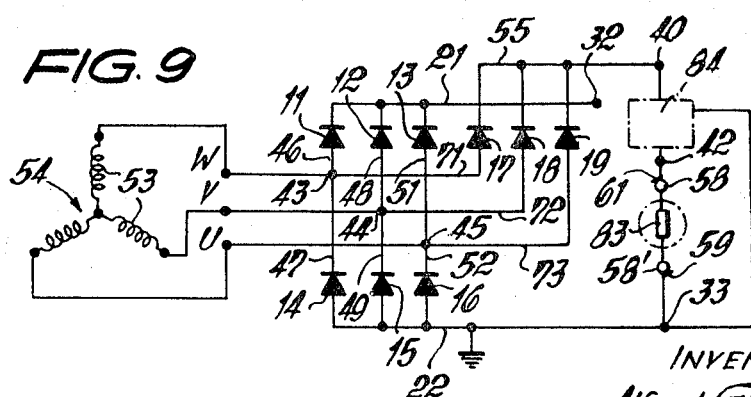
FIG. 9 is a circuit diagram illustrating the rectifier unit in combination with a three-phase generator, as shown in chain lines.

The rectifier unit according to the illustrated embodiment is used for three-phase alternating current, and comprises three semiconductor diodes 11, 12, 13, which will be referred to as plus diodes or positive diodes, three semiconductor diodes 14, 15 and 16, which will be referred to as minus diodes or negative diodes, and three semiconductor diodes 17, 18 and 19 which will be referred to as exciting diodes. As shown in FIG. 9, pairs of positive and negative diodes are connected to each other and to the three terminals W, V, U of a three-phase generator 54, which has windings 53. The exciting diodes 17, 18 and 19 are also connected with the terminals of the three-phase generator 54.

The rectifier unit has an outer annular cooling plate 21 on which the plus diodes 11, 12, 13 are mounted, and an inner annular cooling plate 22 on which the minus diodes 14, 15, 16 are mounted. The annular cooling plates 21, 22 are mechanically connected by an insulator 23, which electrically insulates the two cooling plates 21 and 22.

The outer edge of the inner annular cooling plate 22 has the same outline, shape and dimensions as the inner edge of the outer cooling plate 21. The outer cooling plate has wider portions on which plus diodes 11, 12, 13, respectively, are mounted, and the cooling plate 22 has wider portions on which the minus diodes 14, 15 and 16 are respectively mounted. In the illustrated embodiment, the outer cooling plate 21 has three inwardly projecting portions 24, 25, 26, and the inner annular cooling plate 22 has three outward radially projecting portions 27, 28, 29. As is clearly apparent from FIG. 2, the radially projecting portions 27, 28, 29 alternate with the radially projecting portions 24, 25, 26, and complement the same. One of the plus diodes 11, 12, 13 is mounted on each projecting portions 24, 25, 26 of the outer annular cooling plate 21 in such a manner that its p-part of the p–n junction is in electrical connecting contact with the outer cooling plate 21. On each projecting portion 27, 28, 29 of the inner annular cooling plate 21, one of the minus diodes 14, 15, 16 is mounted in such a manner that its n-part of the p–n junction is in electrical connection with the annular cooling plate 22.

Figure 5:
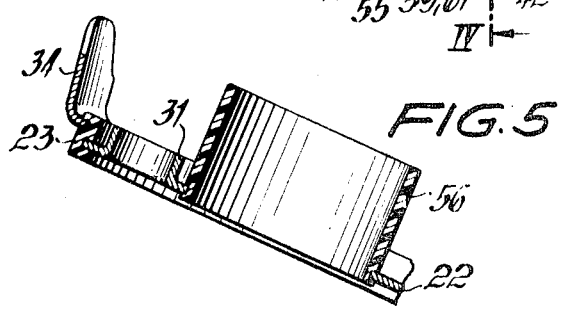
FIG. 5 is a fragmentary sectional view taken along line V—V in FIG. 3.
Figure 4:
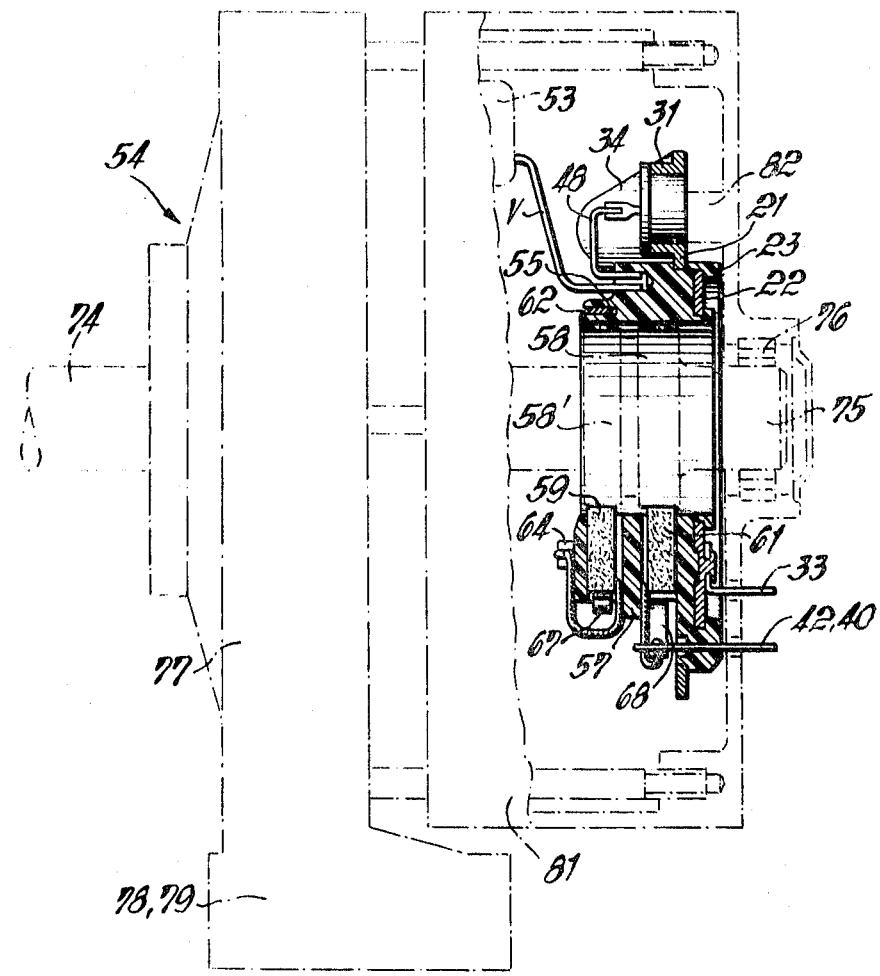
FIG. 4 is an axial sectional view of the rectifier unit taken along line IV—IV in FIG. 3, and including a schematic illustration of a three-phase generator with which the rectifier unit can be advantageously combined.

The electrical conductive connection is obtained at the same time with the mechanical mounting of the diodes 11 to 12 on the respective cooling plates 21, 22, since the diodes are respectively pressed into tubular portions 31 of cooling plates 21, 22, which are best seen in FIG. 4 and FIG. 5.

Annular cooling plates 21, 22 also have connectors 32, 33 for connection with a battery or other consumer, the outer annular cooling plate 21 having connector 32, and the inner annular cooling plate 22 having connector 33.

The outer annular cooling plate 21 has along its outer periphery, three transversely bent portions 34 which, in a plan view and in a section parallel to the planes of the cooling plates 21, 22, have substantially the form of two interconnected stretched out characters S. The transverse portions 34 increase the rigidity of the outer annular cooling plate 21 and thereby of the entire unit, so that no resonance oscillations can take place. Furthermore, the transverse projection 34 improve the heat dissipation. Due to the large surface of the cooling plates 21, 22, a good cooling effect is obtained, and all diodes are located in the stream of cooling air. The unit is also suitable for being mounted in an oil bath, as is used in closed machines for cooling purposes.

Figure 1:
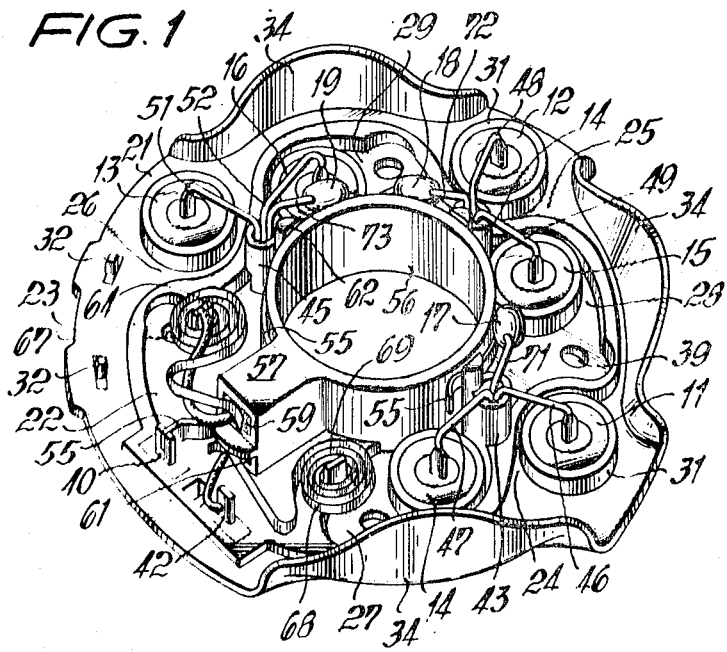
FIG. 1 is a perspective view illustrating a rectifier unit for a three-phase current.

As shown in FIGS. 8a to 8c, the cooling plates 21, 22 are punched out of a band of sheet metal 35. First, the central opening 36, which becomes later on the central opening of the inner annular cooling plate 22, and the peripheral outline of the outer cooling plate 21 are punched out so that the plate member shown in FIG. 8b is produced. Thereupon, the tubular seats 31 for the diodes 11 to 16, the openings 38 for connectors 32, 33, and the openings 39 for mechanically mounting the rectifier unit on the alternating current generator are made. Also, a riveting member 41 for the connector 33 is attached. Finally, the inner annular cooling plate 22 is punched along an annular line out of the plate member shown in FIG. 8b. Thereupon, the corner portion of the plate member are transversely bent over by deep drawing to form the transverse projections 34 whose shape is best seen in FIG. 1.

Figure 2:
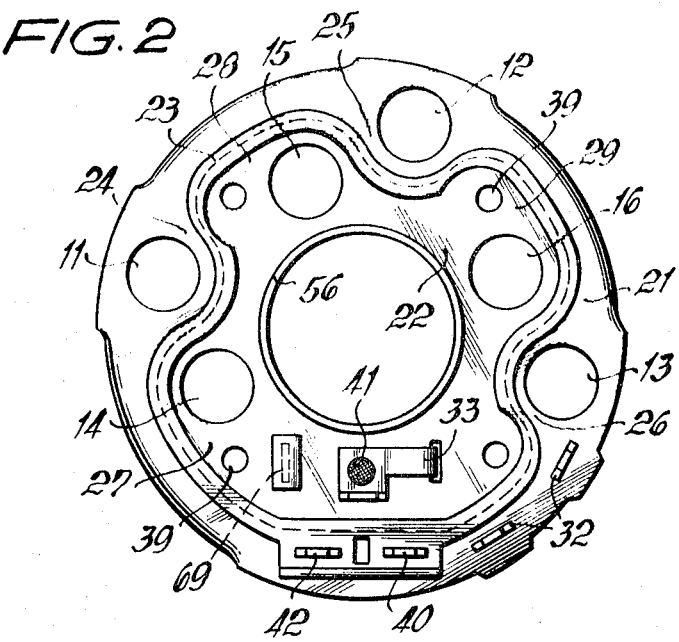
FIG. 2 is a schematic front view of the rectifier unit, with some parts omitted for the sake of clarity.
Figure 3:
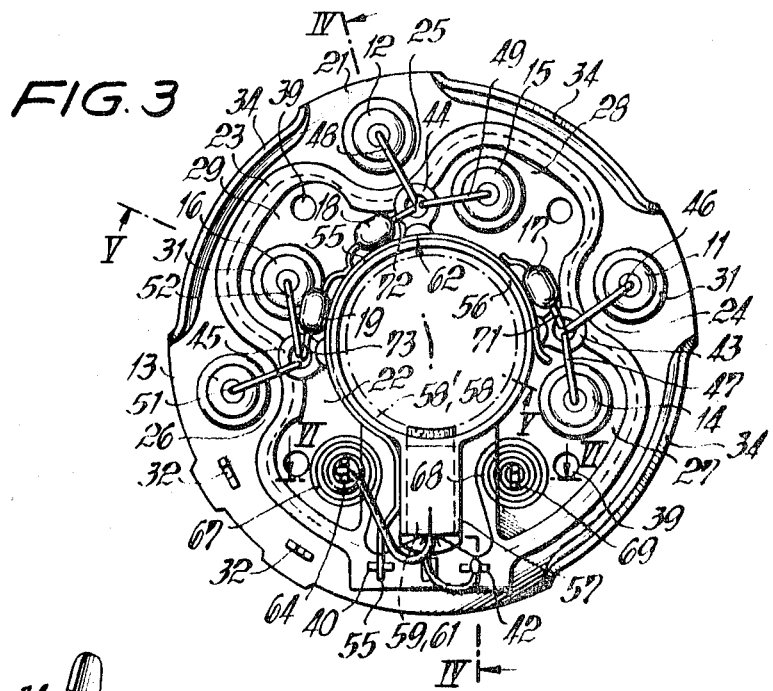
FIG. 3 is a rear view of the rectifier unit.

Insulator 23 has an annular portion which fills the gap between the outer edge of the inner cooling plate 22 and the inner edge of the outer cooling plate 21. Consequently, the annular portion of the insulator 23 follows the edges of cooling plates 21 and 22, as best seen in FIGS. 2 and 3, and has a corresponding wavy shape. In cross section, the annular portion of insulator 23 is substantially S-shaped with two recesses on opposite sides, respectively, the edges of the two cooling plates 21, 22 being respectively located in the recesses formed by the S-shaped cross section, as best seen in FIGS. 4 and 5. In other words, the annular portion of the insulator 23 has two circumferential grooves on the inner and outer faces thereof into which the outer edge of the inner cooling plate, and the inner edge of the outer cooling plate are respectively inserted.

Insulator 23 carries connector elements 40, 42, see FIGS. 2 and 3. Insulator 23 has a tubular portion located in the central opening of the inner cooling plate, and a annular portion located between the outer and inner edges of the cooling plates. Tubular projections 43, 44, 45 connect the tubular portion with the annular portion, and are substantially pot-shaped, being opened at one end, and having a bore at the other end. The three pot-shaped projections 43, 44, 45 receive soldering material for electrical connecting the diodes 11 to 16 in groups. Each pot-shaped projection 43, 44, 45 is associated with a pair of adjacent diodes of opposite polarity, and is substantially located between the respective two diodes of the pair which are mounted on the inner projections of the outer cooling plate, and on the outer projections of the inner cooling plate, respectively.

Connectors 46, 48, 51 of plus diodes 11, 12, 13, respectively, connectors 47, 49, 52 of the respective minus diodes 14, 15, 16, are both located in the open end of the respective pot-shaped projections 43, 44, 45, and are held and connected by the soldering material in the same. For example, the connector 46 of the plus diode 11, and the connector 47 of the minus diode 14, are located in the pot-shaped projection 43 of the insulator 23. The bottoms of the pot-shaped projections 43, 44, 45 have a narrow bore through which connector elements of the terminals W, V, and U of the windings 53 of the three-phase generator 54 are threaded so that pairs of plus and minus diodes are respectively connected with the three terminals of the generator 54, as best seen in FIG. 9.

The tubular portion 56 of insulator 23 located in the central opening of the inner annular cooling plate 22, serves several purposes. Not only the pot-shaped soldering projections 43, 44, and 45 are connected therewith, but the tubular part 56 has a circumferential groove in which a conductive band 55, see FIGS. 3 and 4, is located. The three exciting diodes 17, 18 and 19 have first terminals connected with the connector band 55 which is located in groove 62 at the height of the pot-shaped projections 43, 44, 45, and is connected at one end with the connector 40. The first terminals of exciting diodes 17, 18, 19 are welded to the connector band 55, while the second terminals 71, 72, 73 of exciting diodes 17, 18 and 19 are located in the pot-shaped projections 43, 44, 45 and held by the soldering material in the same. For example, connector 71 of exciting diode 17 is located in pot-shaped projection 43, and thereby connected with the plus diode 11 and the minus diode 14.

Each pot-shaped projection, when filled with soldering material, connects the cathode of a plus diode, the anode of a minus diode, a terminal of one exciting diode, and a terminal of a three-phase winding of the alternating current generator with each other.

Figure 6:
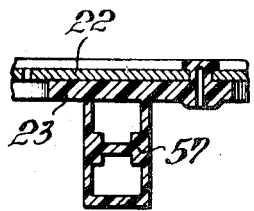
FIG. 6 is a fragmentary sectional view taken along line VI—VI in FIG. 3.
Figure 7:
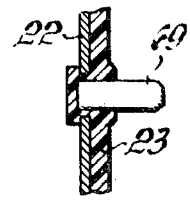
FIG. 7 is a fragmentary sectional view illustrating a detail of the rectifier unit.

The tubular portion 56 contains a brush holder 57 with guide ways for brushes 59, 61 which can be pressed against the slide rings 58, 58' of the alternating current generator 54. The brush holder 57, see also FIG. 6, is integral with the insulator 23, and of rectangular shape. The guide ways for the brushes 59, 61 have rectangular cross sections and extend perpendicularly to the axis of the tubular portion 56 in which the slide rings 58, 58' are located. The brush 59 is connected by connector 33 to ground, as best seen in FIG. 9.

The tubular portion 56 is connected with the annular portion in the gap between the outer and inner edges of the two cooling plates 21, 22 by the three pot-shaped projections 43, 44, 45, and also by the brush holder 57.

The connector 33 on the inner annular cooling plate 22 has an extension 64 passing through the inner annular cooling plate 22, and being connected with brush 59. Another connector 42 connects brush 61 to regulator 84, which is connected by the connector 40 with the three exciting diodes 17, 18 and 19.

Each brush 59, 61 is pressed against the respective slide rings 58, 58' by springs 67, 68 which have spiral shape. One spring 67 is mounted on the extension 64, and the other spring 68 is mounted on a lug 69 of insulator 23.

Insulator 23 which in addition to insulating annular cooling plates 21, 22 from each other, also mechanically supports the same furthermore serves to support the brushes, the exciting diodes, the soldering connections, and supports plug connectors. The insulator 23 is preferably made out of a synthetic material by injection molding.

The mechanical and electrical connections between the rectifier unit and a three-phase alternating current generator 54 are best seen in FIGS. 4 and 5. .Generator 54 has a drive shaft 74, which may be driven by combustion engine, which is part of an automobile. The output shaft 74 is supported in a roller bearing 76 and carries two slide rings 58, 58' for supplying current to the field winding 83 which rotates with shaft 74. As explained above, the brushes 59 and 61 slide on the slide rings 58,58' so that the field winding is provided with rectifier direct current. The closure cap 77 has two attaching arms 78 and 79, while the closure cap 81 on the output side, carries the rectifier unit by which the three-phase voltage generated by generator 54 in its windings 53 is rectified. The rectifier unit is screwed to four projections 82 of the closure cap 81, one of which is shown in FIG. 4, and also in FIG. 2 at 39.

The rectifier unit of the invention serves not only for rectifying the alternating current, but takes the place of a stator circuit of the generator. The brush holder can be made in a simple manner since it is injection-molded together with insulator 23 which mainly serves to mechanically connect the cooling plates 21 and 22 which are also in conductive contact with the plus diodes and minus diodes.

The assembly of the rectifier unit is very easy, since the brush holder and the connectors form one mechanical unit with the cooling plates 21,22 of the diodes so that separate connecting wires to the brush holder are eliminated. For a connection to a regulator 84, see FIG. 9, which is advantageously provided in the circuit, only three connecting wires are required, as shown in FIG. 9. The mounting on the rectifier unit in the casing of generator 55 is thus very easy, and consequently the rectifier unit can be removed for servicing without any difficulty. On the other hand, the compact and rigid construction of the rectifier unit can withstand all stresses occurring during operation of the generator.

The regulator 84 may be a semiconductor voltage regulator in which it can be mounted directly on the rectifier unit, resulting in a further simplification due to the elimination of the connecting wires to the regulator.

It will be understood that each of the elements described above, or two or more together, may also find a useful application in other types of rectifier units differing from the types described above.

While the invention has been illustrated and described as embodied in a rectifier unit in which all rectifying diodes are mounted on a pair of conductive cooling plates which are mechanically connected by an insulator, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Rectifier unit comprising, in combination, first and second sets of diodes; a first cooling plate supporting said first set of diodes and having an outer edge; a second cooling plate supporting said second set of diodes and having an inner edge, said first and second cooling plates being located in parallel planes; and an insulator means engaging said inner and outer edges for electrically insulating said cooling plates from each other while mechanically connecting said first and second cooling plates to each other in a centered position in which said inner and outer edges do not overlap.

2. Rectifier unit as claimed in claim 1 wherein said first and second cooling plates are annular and substantially concentric.

3. Rectifier unit as claimed in claim 2 wherein said inner and outer edges have matching outlines and dimensions, and are parallel in said centered position.

4. Rectifier unit as claimed in claim 3 wherein each of said first and second annular cooling plates has circumferentially alternating portions which are wide and narrow, respectively, in radial direction; and wherein said first and second diodes are mounted on said wide portions of said first and second annular cooling plates, respectively, and alternate in circumferential direction.

5. Rectifier unit as claimed in claim 4 wherein said wide portions of said first annular cooling plate include first portions outwardly projecting from said outer edge; wherein said wide portions of said second annular cooling plate include second portions inwardly projecting from said inner edge and alternating with said first portions; wherein said first and second cooling plates are conductive; wherein said first and second sets of diodes are mounted, respectively, in the regions of said first and second portions; and wherein the plus terminals of the diodes of one of said first and second sets, and the minus terminals of the diodes of the respective other set are in conductive contact with the respective cooling plate on which they are mounted.

6. Rectifier unit as claimed in claim 5 wherein each of said cooling plates has tubular seats in which said diodes are located and frictionally held in conductive contact.

7. Rectifier unit as claimed in claim 5 wherein said second annular cooling plate has along the outer periphery thereof projections bent transversely out of the plane of said second annular cooling plate to increase the rigidity and heat dissipation of the same.

8. Rectifier unit as claimed in claim 3 wherein said insulator means is at least partly located between said inner and outer edges abutting the same along the lengths thereof to fill the gap between the same.

9. Rectifier unit as claimed in claim 8 wherein said insulator means includes an annular part having a substantially S-shaped cross section with opposite recesses respectively receiving said inner and outer edges.

10. Rectifier unit as claimed in claim 9 wherein said insulator means has a part formed with openings therethrough; and comprising connectors in said openings having ends located on opposite sides of said insulator means and of said first and second cooling plates.

11. Rectifier unit as claimed in claim 3 wherein said diodes of said first and second sets alternate in circumferential direction of said first and second cooling plates and form pairs of adjacent diodes; wherein said insulator means has pot-shaped projections located between the diodes of each pair; wherein said pairs of diodes have connectors located in said pot-shaped projections at the open end of the same; and comprising soldering material in said pot-shaped projections.

12. Rectifier unit as claimed in claim 11 comprising other connectors inserted into the other ends of said projections; and wherein said other ends have narrow bores for the passage of said other connectors.

13. Rectifier unit as claimed in claim 11 comprising a conductor mounted on said insulator means; a set of exciting diodes mounted on said first cooling plate and having first terminals connected with said conductor, and second terminals respectively located in said open ends of said pot-shaped projections.

14. Rectifier unit as claimed in claim 3 wherein said first cooling plate has a central opening; wherein said insulator means includes a tubular portion located in said central opening and an annular portion located between said inner and outer edges.

15. Rectifier unit as claimed in claim 14 wherein said tubular portion is formed with a circumferential groove; comprising a conductor band located in said groove; and a set of exciting diodes having first terminals connected with said conductor band and second terminals connected with pairs of diodes of said first and second sets.

16. Rectifier unit as claimed in claim 15 wherein said insulator means includes pot-shaped projections connecting said tubular portion with said annular portion; wherein said pairs of diodes have pairs of connectors located in said pot-shaped projections, respectively; wherein said second terminals of said exciting diodes are located in said pot-shaped projections, respectively; and comprising soldering material filling said pot-shaped projections.

17. Rectifier unit as claimed in claim 14 wherein said tubular portion of said insulator means is formed with two radial guide ways; and two brushes in said guide ways adapted to engage slide rings located in said tubular portion.

18. Rectifier unit as claimed in claim 17 comprising a first connector secured to said insulator means, passing through an opening in said first cooling plate, and being connected with one of said brushes; and a second connector passing through said insulator means and connected to an other brush of said brushes.

19. Rectifier unit as claimed in claim 18 comprising two springs for biassing said brushes, one of said springs being mounted on an extension of said first connector; and wherein said insulator means has a supporting lug on which the other spring is mounted.

20. Rectifier unit as claimed in claim 14 wherein said insulator means consists of an injection molded synthetic material.